Feb. 19, 1957     F. X. LAMB     2,782,371
ELECTRICAL INSTRUMENT
Filed March 28, 1952     2 Sheets-Sheet 1
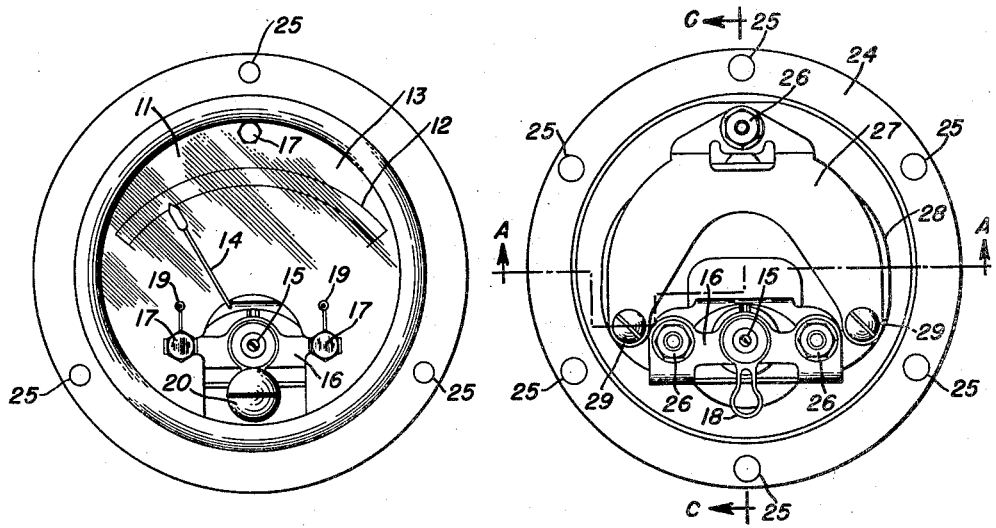
Fig-1.
Fig-2.
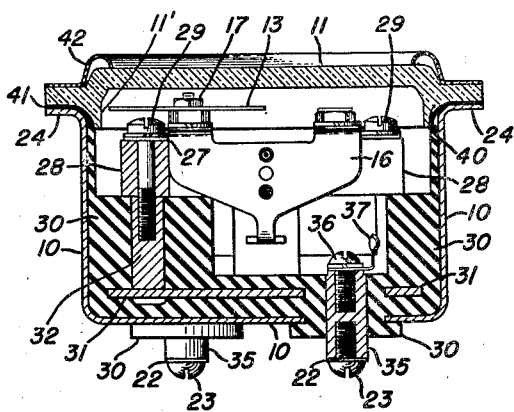
Fig-4.
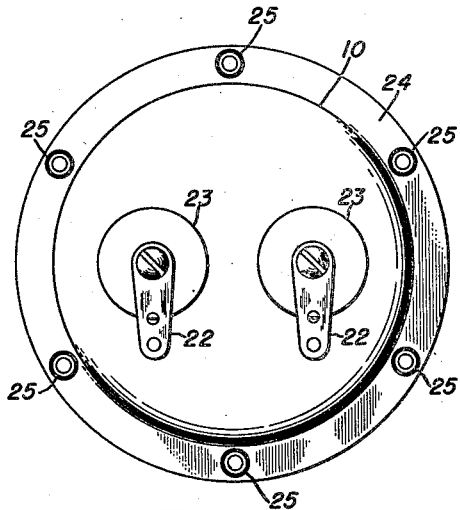
Fig-3.
FRANCIS X. LAMB
INVENTOR.
BY
ATTORNEYS

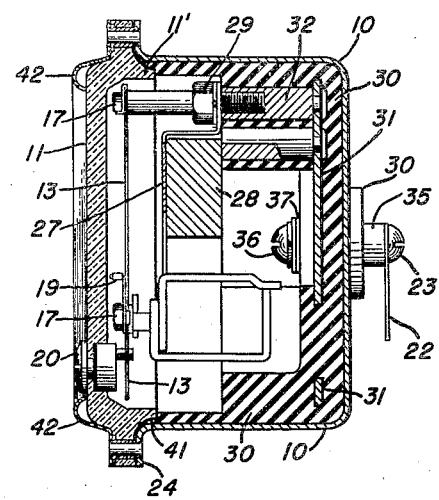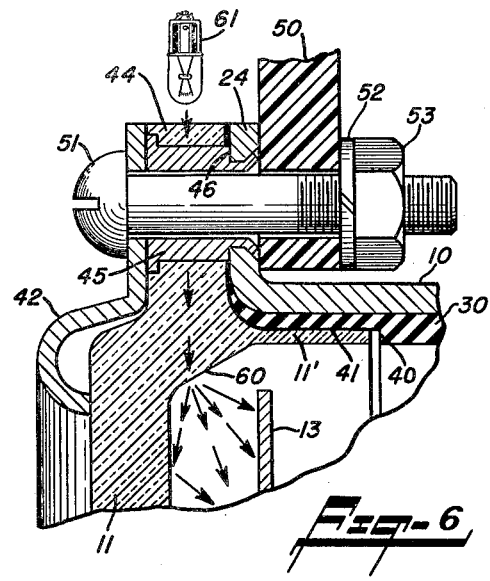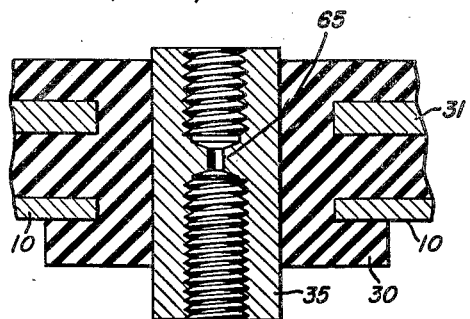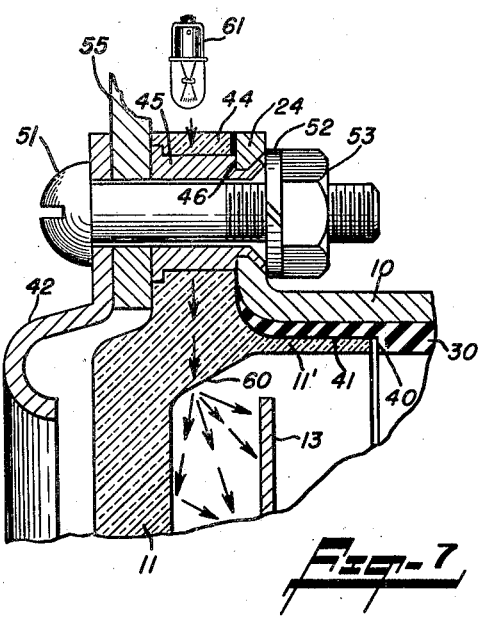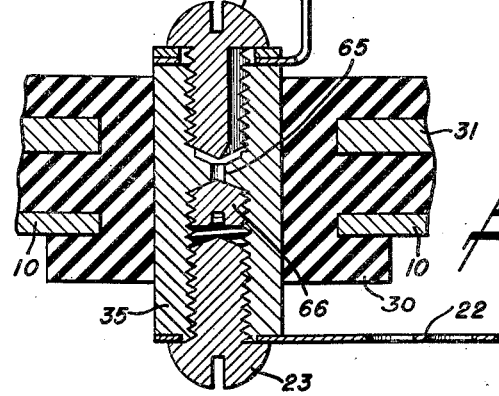
FRANCIS X. LAMB
INVENTOR.

United States Patent Office 2,782,371
Patented Feb. 19, 1957

2,782,371

ELECTRICAL INSTRUMENT

Francis X. Lamb, East Orange, N. J., assignor to Weston Electrical Instrument Corporation, Newark, N. J., a corporation of New Jersey Application March 28, 1952, Serial No. 279,129

20 Claims. (Cl. 324—156)

This invention relates to electrical instruments and more particularly to the novel construction of a housing for instruments such as voltmeters, ammeters, wattmeters, of the ruggedized, sealed class.

Instruments of the class contemplated by this invention generally comprise a case in which the instrument mechanism is mounted, a transparent cover member closing an end of the case, and a pointer cooperating with a suitable scale, the pointer and scale being visible through the cover member. Instruments of this type which are designed to withstand rather severe vibrations and mechanical shocks are known in the art as ruggedized instruments. To provide suitable protection for the delicate instrument mechanism it is the general practice to mount the mechanism on supporting members which are imbedded in a suitable vibration-absorbing material such as rubber. In accordance with present practice the rubber vibration isolator has a finite depth, usually 3/8" to 1/2", and is either forced into the bottom of the instrument case or molded directly therein. In the present invention I mold the rubber into the instrument case but such material extends along the entire, inner wall of the case and into direct contact with the transparent cover. Such construction affords practical advantages, such as provision of increased dielectric strength between the instrument case and mechanism, provision of a smaller instrument in that the metal parts may be dimensioned to reduce the spacing therebetween, and provision of a more perfect seal between the major parts forming the housing, all of which will become more apparent from the detailed description of the invention.

Further, I make the transparent cover member of a plastic material having a novel shape and dimensions resulting in a more pleasing appearance of the instrument, maximum facility with respect to the assembly of certain parts and affording unique advantages with respect to illuminating the instrument scale plate by means of edge lighting. Still further, I provide a novel assembly arrangement for the transparent cover and associated parts whereby the instrument may be mounted from the front or rear of a panel with equal facility and without in any way imposing mechanical stresses upon the cover member. These feaures of my invention are of practical scope and cannot be duplicated by prior constructions of ruggedized, sealed instruments, so far as I am now aware.

An object of this invention is the provision of a ruggedized instrument of novel construction, particularly of small size, pleasing appearance and high dielectric strength and one which meets all standard tests for instruments of this class.

An object of this invention is the provision of a ruggedized instrument in which the assembly arrangement of the transparent cover and cooperating parts permits the mounting of the instrument from the front or back of a panel and which instrument may be internally illuminated by exterior edge lighting.

An object of this invention is the provision of a ruggedized instrument wherein the transparent cover member is made of a plastic material, said member having a novel shape whereby light rays entering the edge of the member are refracted to the instrument scale plate.

An object of this invention is the provision of a ruggedized instrument comprising a metal case open at one end, a resilient, vibration-absorbing material molded into the case, said material extending along the entire inner wall of the case, a transparent plastic cover having a generally dish-like shape including edges extending into the open end of the case and overlapping a portion of said vibration-absorbing material, the base of said cover lying beyond the limits of the case edge, and means securing the said cover to the case without stressing the plastic material.

An object of this invention is the provision of a ruggedized sealed instrument wherein the connection terminals include members molded in rubber and which members serve as the means for flushing the interior of the housing and/or establishing a desired atmosphere within the housing.

These and other objects and advantages will become apparent from the following detailed description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 1 is a front view of an instrument made in accordance with this invention;

Figure 2 is similar to Figure 1 but with the instrument cover and scale plate removed to show certain parts of the instrument mechanism:

Figure 3 is a bottom view of the instrument;

Figure 4 is a sectional view taken along the line A—A of Figure 2;

Figure 5 is a sectional view taken along the line C—C of Figure 2;

Figure 6 is a fragmentary, sectional view, drawn to an enlarged scale showing how the plastic cover is secured to the case flange and how the instrument is mounted from the front of a panel;

Figure 7 is similar to Figure 6 but showing the instrument mounted from the rear of a panel; and Figures 8 and 9 are fragmentary, sectional views, drawn to our enlarged scale, showing a modification of the connection terminal to permit flushing out the interior of the instrument housing.

Reference is now made to Figures 1 to 3. The instrument housing comprises a relatively deep, cup-like member 10, usually referred to as the case, and a transparent cover or window 11. In ruggedized instruments the case is drawn of metal and, in the case of a sealed instrument, the cover is sealed to the case to provide a moisture-tight housing as will be explained in detail hereinbelow. A suitably-calibrated scale 12, carried by the scale plate 13, and a cooperating pointer 14, are visible through the window. The illustrated instrument is of the permanent magnet, movable coil type but those skilled in this art will understand my invention is not limited to such specific mechanism. Since the general construction of the instrument mechanism does not form an essential feature of the present invention such mechanism is presented only in sufficient detail to facilitate a proper understanding of the invention. Suffice it to say the pointer 14 is carried by a movable coil which is supported for pivotal movement by suitable pivots and jewel screws, the upper jewel screw 15, carried by the upper bridge 16, being visible in Figures 1 and 2. Also, the scale plate 13 is secured in position by means of the screws 17, threaded into suitable posts, the lower of such screws also retaining conventional pointer stops 19 in proper position to prevent damage to the pointer upon rotation of the latter beyond the scale range. A zero adjuster screw 20 passes through the instrument cover such adjuster screw being mechanically coupled to the upper abutment 18 of the instrument whereby the zero position of the pointer can readily be adjusted externally of the instrument. When the instrument is of the hermetically sealed class the construction of the zero adjuster mechanism must be such that moisture cannot enter into the housing through the necessary opening in the cover. Numerous constructions satisfactory for this purpose are known in the art. The instrument mechanism can be connected to an external circuit by means of suitable terminals extending through the bottom of the case. As shown in Figure 3, the terminals may comprise the soldering lugs 22 secured to the back connection rods by the screws 23.

In instruments of this type, designed for panel mounting, the open end of the case is provided with an integral outwardly-extending flange 24 offset in a plane normal to the case axis. Such flange includes a plurality of holes for accommodation of the screws by which the instrument is fastened to the panel, three such holes 25 being shown in the front view of the instrument, Figure 1. In the present instance, however, I provide six such holes in the case flange, as shown in Figures 2 and 3, the additional holes serving a specific purpose as will be described with reference to the sectional views of Figures 4 and 5.

Reference is now made specifically to Figure 2 which is a front view of the instrument, similar to Figure 1, but with the transparent cover, pointer and scale plate removed. Here are shown the top abutment 18 pivotally carried by the bridge 16, the upper jewel screw 15, and the vertically-extending posts 26 each having a threaded hole in the upper end to take the scale-holding screws 17 shown in Figure 1. A mounting plate 27 overlies the permanent magnet 28 such plate being secured by the bolts 29 to suitable posts imbedded in the rubber, vibration-isolating material as will now be described.

Reference is now made to Figures 4 and 5 which are sectional views taken along the lines A—A and C—C, respectively, shown in Figure 2 but with the transparent window 11 in place. A rubber member 30, is molded into the case 10, such member constituting the vibration isolator for the instrument mechanism and the electrical insulation between the metal case and the mechanism components. Molded directly in the rubber is a plate 31 to which the mechanism-anchoring posts 32 are secured as by riveting. These posts have threaded holes in the free ends to receive the mounting bolts 29, the latter passing through suitable holes provided in the magnet 28. It may here be stated the components forming the instrument mechanism are supported in one way or another from the magnet and the rubber 30 is provided with a flat, upper surface upon which the magnet rests. It is apparent, therefore, that the entire instrument mechanism is secured in relatively-fixed position and supported by the posts 32 and the plate 31 imbedded in the rubber and that there is no direct contact between any of the internal metal parts and the metal case.

This isolating construction is also applied with respect to the connection rods by which current is conducted into the instrument. Such connection rods comprise the metal rods 35 which are directly molded in the rubber 30. As shown in Figure 4, the bottom of the case 10 is provided with enlarged holes whereby the rubber 30 forms a complete collar around each such rod. The mold employed in the operation of molding the rubber into the case is provided with suitable, circular recesses whereby the rubber extends through the holes in the case bottom and expands outwardly to form circular flanges abutting against the exterior surface of the case bottom. Such design anchors the entire rubber molding firmly to the case. Each of the metal rods 35 is provided with alined, blind, threaded holes at each end. The inner holes accommodate the screws 36 which serve to secure the metal soldering terminals 37 to which connection leads may be soldered for conducting current to the electrical mechanism. The outer holes receive the screws 23 which serve to secure the outer soldering lugs 22 to which external lead wires may be connected. From the above description it will be apparent the bottom of the instrument housing effectively is sealed against the entrance of moisture into the housing.

Attention is directed to the fact that the unitary rubber molding 30 extends along the entire inner surfaces of the case 10 and terminates at the open end of the case in an upper side wall of reduced thickness resulting in a circular ledge 40, as shown more clearly in Figure 6. The plastic cover 11 has a generally dish-like configuration having a cylindrical ring or hollow wall portion 11' extending from the approximate edge of the base portion of said cover into the case and overlapping the upper portion of the side wall of the rubber 30. Such overlapping arrangement provides a substantial surface area over which the cover can be sealed to the rubber as indicated by the sealing compound 41. Inasmuch as the rubber 30 extends along the entire inner side wall of the case the components of the instrument mechanism can extend into contact with the rubber side wall and still result in an instrument capable of withstanding a high voltage breakdown test applied between the case and the mechanism. Consequently, my construction makes it possible to reduce the case diameter for any instrument mechanism of a given size, or to increase the size of the mechanism for a given case diameter, or to provide an instrument of given design with a higher dielectric test voltage, as compared to present constructions wherein air spacing between the case and parts of the mechanism is relied upon for electrical insulation purposes. The plastic cover 11 is secured to thes case flange 24 by novel means, which will be described with specific reference to Figures 6 and 7, and a removable outer ring 42 contributes to the improved appearance of the instrument front.

Figure 6 is a fragmentary view of the upper, left-hand corner of Figure 5 and drawn to an enlarged scale to show the means for securing the plastic cover 11 to the flange 24 of the case 10. This view shows clearly the large surface area of mutual contact between the rubber molding 30 and the ring portion 11' of the cover with the sealing compound 41 spread over such area. While the drawings illustrate the cover ring cemented to the rubber those skilled in this art will understand that a moisture tight seal between these members may be provided by other means, such as a coating of non-fluid, viscous material generally referred to as vacuum grease, or by the use of a pressure-sensitive adhesive tape having both flat surfaces covered with the adhesive material. The flat flange portion 44, of the transparent cover, which has inner and outer substantially parallel surfaces, is provided with a hole terminating in an enlarged diameter counterbore and the flange 24, of the case 10, is provided with an alined, countersunk hole. A headed, hollow rivet 45 is disposed with the hole in the cover and the tail end thereof is spun, or pressed, outwardly to conform to the countersunk hole in the case flange 24. It will be noted that the minimum diameter of the hole in the case flange 24 is less than that of the adjacent portion of the hole in the cover. Further, the tail end of the rivet 45 is of a corresponding, reduced diameter resulting in a shoulder 45 that abuts against the surface of the case flange and the axial length of the rivet from the shoulder 46 to outer surface of the head is just slightly greater than the corresponding thickness of the cover flange 44. Consequently, the free end of the rivet can be deformed outwardly under a considerable, applied pressure to form a good, secure mechanical connection between the rivet and the case flange without thereby stressing the plastic cover. As stated above, the case flange 24 and the cover flange 44 are each provided with six alined holes with a rivet, of the type just described, disposed within each set of such holes. The outer ring 42 may likewise include six such alined holes and, since each of the rivets are hollow, such design permits the use of six (6) screws for mounting the instrument on a panel. However, the front ring 42 usually is provided with only three (3) holes, as shown in Figure 1, for instrument mounting purposes.

As has been pointed out, above, the plastic cover 11 is secured to the case flange 24 by six rivets of the type shown in Figure 6 and the cover may be cemented to the rubber 30, whereby the front of the instrument effectively is sealed. The removable front ring 42 abuts against the flange 44, of the cover, when the instrument is mounted from the front of a suitable panel 50, here shown as a relatively thick plate of plastic material. As is well known, such panel is provided with a large, circular, clearance hole for the case 10 and three smaller holes alined with the three holes of the front ring 42, see also Figure 1. Suitable mounting screws 51 pass through the alined holes in the ring 42 and the panel and cooperate with lock washers 52 and nuts 53 to secure the instrument to the panel. As shown in Figure 7, the instrument may also be mounted from the rear of a panel 55 here shown as a metal plate. In this case, the cover flange 44 abuts against the rear panel surface and the front ring 42 is abutted against the front panel surface. By reason of the shape of the cover 11 the front portion thereof extends somewhat through the panel and the sloping side wall of the cover is covered by the arcuate portion of the outer ring 42 whereby the general appearance of the instrument front is the same in both panel mounting arrangements. In either mounting arrangement the mounting nuts 53 can be drawn up tightly on the mounting screws 51 without developing pressure stresses in the plastic cover as the resulting pressure is applied to the rivet 45, specifically, between the rivet head and the rivet shoulder 46, and not to the cover flange 44.

The bulging shape of the plastic cover 11 affords certain advantages with respect to illuminating the instrument scale carried by the scale plate 13. As shown in Figure 6, the scale plate 13 is disposed substantially in the plane of the case flange 24 and below the plane of the cover flange 44, which lies in a plane substantially parallel to that of the base portion and is disposed between the latter and the edge of the wall portion 11'. The inner wall portion 60 of the cover 11 forms a truncated cone disposed between the planes of the substantially parallel surfaces of the flange portion 44, whereby the surface 60 is inclined with respect to cover flange 44 and the scale plate 13. Thus, light rays, indicated by the arrows and coming from a small lamp 61 positioned adjacent to the edge of the cover, will pass through the cover flange 44, emerge in dispersed form from the inclined surface 60 and strike the proximate surface of the scale plate 13, it being understood the lamp is positioned to one side of the upper case-mounting hole so that the light rays will not be obstructed by the upper rivet 45. By employing two small lamps positioned at the top of the instrument and to either side of the upper mounting hole I obtain a surprisingly uniform illumination of the instrument scale. When the instrument is front mounted on a panel the lamp, or lamps, 61 can be provided with suitable opaque hoods to screen from the eyes of the observer those light rays not directed into the plastic cover. When the instrument is back mounted on the panel such hoods are not required as the panel blocks the lamps from the observers view.

In addition to the providing good instrument illumination, the bulging shape of the cover affords a very practical advantage with respect to the assembly of the instrument. In ruggedized instruments the instrument mechanism is secured in position within the case by means of mounting bolts which must be seated into position from the open case front. Consequently, the scale plate must be inserted into position after the mechanism has been properly secured to the parts that are imbedded in the rubber. Since it is desirable to have the scale plate of maximum possible size, to obscure the interior instrument components, the insertion of such scale plate under the pointer and into proper position for attachment to the scale plate supports, is a difficult operation if the final plane of the scale plate is substantially below that of the case flange 24, as would be the case if the transparent cover was a flat, mono-planar member. However, in my construction, the bulging front of the cover permits the positioning of the scale at the very front of the instrument case thereby materially facilitating the installation of the scale plate. Still further, this particular construction, including the reinforcing, axially-extending ring 11' results in an extremely strong cover capable of withstanding excessive temperature changes and mechanical shocks.

In sealed instruments it is often desirable to flush out the interior of the housing with dry air or gas and then fill the housing with a suitable medium such as an inert gas. I provide a simple means for this purpose as will now be described with reference to Figures 8 and 9. I have already stated that the rods 35, by which electrical connection is made between an external circuit and the instrument mechanism, normally are provided with blind, threaded holes at each end. When the interior of the instrument is to be flushed out the separating wall between the alined, threaded holes, in each of the rods, may be broken through by a small drill to provide a passageway 65, as shown in Figure 8. This operation is performed before the instrument mechanism is secured within the case. The inner screw 36', which secures the soldering lug 37 to the rod 35, is then threaded into position as shown in Figure 9. In this case, however, the screw 36' has a longitudinal slot running the full length of the shank and the shank length of the screw is such that when the screw is seated in position it will not completely block the small air passageway 65. If we now consider the headless screw 66 removed, it will be apparent gas may be forced into the instrument housing by a hose connected to the rod 35 and air may pass out of the housing through a similar air passageway provided in the other connection rod of the instrument. When such operation is completed the screw 66 is threaded into position as shown, such screw being headless, of relatively small length and having a tapered end adapted to completely close off the passageway 65. The outer screw 23, which secures outer soldering terminal 22 to the rod 35, can now be threaded into position.

Having now described my invention in detail in accordance with the patent statutes those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. In a housing for an electrical instrument: a cup-shaped case having an open end terminating in an outwardly-directed flange, a unitary cup-shaped, resilient insulator member molded directly within the case, said member, extending along the entire inner wall of the case, supporting members imbedded in said insulator member said members being spaced from the case and adapted to support the instrument mechanism, and a transparent cover closing the open end of the case, said cover including a flange portion abutting the case flange and a cylindrical ring portion extending into the case and overlapping the side wall of the insulator member.

2. The invention as recited in claim 1, wherein the bottom of the case includes a set of holes and the said insulator member extends through such holes and terminates in enlarged flange portions abutting the outer surface of the case bottom in the vicinity of the holes.

3. The invention as recited in claim 2 and including a metal terminal rod passing through each hole in the case bottom such rods each having a central portion surrounded by the insulator member whereby each terminal rod is insulated from the case.

4. The invention as recited in claim 1 including a plurality of countersunk holes in the case flange, a plurality of holes in the cover flange portion, said holes being alined with those in the case flange and each such hole terminating in a counterbore, hollow rivets disposed within each set of alined holes, each rivet having a head disposed within the counterbore portion of the cover hole and a tail end offset in the countersunk hole in the case flange.

5. The invention as recited in claim 4, wherein the tail end of each rivet is of a smaller diameter than the rivet shank resulting in a shoulder that abuts against the forward surface of the case flange, and the axial length of each rivet taken from the outer surface of the head to the said shoulder is slightly greater than the thickness of the cover flange portion.

6. The invention as recited in claim 1, wherein the said transparent cover is bulged outwardly to form a central, substantially flat portion lying in a plane parallel to the cover flange portion, and said cover flange portion is riveted to the case flange.

7. The invention as recited in claim 6 wherein the inner wall of the cover between the said central portion and the said ring portion is in the form of a truncated cone.

8. In a housing for an electrical instrument: a metal, cup-shaped case having a set of holes in the bottom and terminating in an outwardly-directed flange at the open end; a unitary, rubber, insulator member molded within the case, said member having relatively thin side walls extending along the entire inner case wall, a relatively thick base portion abutting the case bottom and substantially filling the holes in the case bottom, and flange portions expanding outwardly of said holes and abutting the outer surface of the case bottom; metal terminal rods molded in said insulator member, each rod passing axially through one of the holes in the case bottom; and a transparent plastic cover closing the open end of the case, said cover being of dish-like shape including a relatively-flat, central portion constituting the window of the instrument, an outwardly-extending flange portion abutting the case flange and an intermediate, cylindrical ring portion extending into the case and overlapping a portion of the side wall of the said insulator member.

9. The invention as recited in claim 8, wherein the case flange and the flange portion of the cover include alined holes and including hollow rivets passing through such alined holes, said rivets securing the cover to the case.

10. The invention as recited in claim 9, wherein that portion of the side wall of the insulator member overlapped by the ring portion of the cover is of reduced thickness and such overlapping surfaces are secured together with a cement.

11. The invention as recited in claim 8 and including supporting members molded into the base portion of the insulator member, said supporting members being spaced from the case and adapted to support the instrument mechanism.

12. An electrical instrument of the ruggedized class and comprising a metal, cup-shaped case having an open end terminating in an outwardly-directed flange including a plurality of holes; a resilient, insulator member molded within the case, said member covering the entire inner surfaces of the case; supports imbedded in said insulator member and spaced from the case; an instrument mechanism including a scale plate disposed within the case, said scale plate lying substantially in the plane of the case flange; means removably securing the mechanism to the said supports; and a transparent cover closing the open end of the case, said cover including a flange portion abutting the case flange and provided with holes alined with the holes in the case flange and a cylindrical ring portion extending into the case and overlapping a portion of said insulator member.

13. An electrical instrument of the ruggedized class comprising a metal, cup-shaped case having a set of holes in the bottom and terminating in an outwardly-directed flange at the open end; a unitary, rubber member molded within the case, said member having relatively-thin side walls extending along the entire inner wall of the case and a relatively-thick base portion covering the bottom of the case, said base portion extending through the holes in the case bottom and expanding outwardly of the holes in the form of flanges abutting the outer surface of the case bottom; threaded supports imbedded in the base portion of the rubber member and spaced from the case; an instrument mechanism including a scale plate disposed within said case, said scale plate lying substantially in the plane of the case flange; mounting screws securing the mechanism to the supports; connection rods molded in the rubber member, each rod passing centrally through a hole in the case bottom; a transparent plastic cover closing the open end of the case, said cover being of dish-like shape including a relatively-flat central portion overlying and spaced from the said scale plate, an outwardly-extending flange portion abutting the case flange and an intermediate, cylindrical ring portion extending into the case and overlapping a portion of the side wall of the rubber member, and means securing the cover flange portion to the case flange.

14. The invention as recited in claim 13 wherein the case flange includes a plurality of countersunk holes, the cover flange portion includes a plurality of holes alined with those in the case flange and having a counterbore at one end, and including headed, hollow rivets passing through each set of alined holes, each rivet having a head disposed within the counterbore and a tail offset in the countersunk hole in the case flange.

15. The invention as recited in claim 14, wherein the tail end of each rivet is of a smaller diameter than the rivet shank resulting in a shoulder that abuts against the forward surface of the case flange, and the axial length of each rivet taken from the outer surface of the head to the shoulder exceeds the thickness of the cover flange portion.

16. The invention as recited in claim 14 including a thin, outer ring having a flat portion adapted to abut the cover flange portion and an arcuate portion adapted to partially overlie the cover central portion, said flat section of the outer ring including holes alined with the hollow rivets, and including mounting screws for securing the outer ring to the instrument, said screws passing through the holes in such ring and through the associated rivet.

17. The invention as recited in claim 13, wherein the inner wall of the cover between the said central portion and the said ring portion is in the form of a truncated cone.

18. The invention as recited in claim 17 and including an outer ring removably secured to the case flange, said outer ring partially-overlying the central portion of the cover.

19. The invention as recited in claim 13, wherein at least one of the said connection rods includes axial, threaded holes in each end, each hole communicating with a common passageway of reduced diameter and including a headless screw threaded into one of said holes and closing said passageway.

20. For an electrical instrument, a transparent plastic cover comprising a unitary dish-shaped member including a substantially flat base portion, a hollow cylindrical wall portion extending from the approximate edge of said base portion, and a flat annular flange portion having inner and outer substantially parallel surfaces and extending outwardly beyond said wall portion, lying in a plane substantially parallel to that of the base portion and disposed between the latter and the edge of said wall portion, the inner surface of said wall portion uniting with the inner surface of said base portion along a truncated conical surface disposed between the planes of said substantially parallel surfaces of said flange portion, so that light rays which pass inwardly from the outer edge of said flange portion will, after traversing said flange portion, emerge in dispersed form from said conical surface.

References Cited in the file of this patent

UNITED STATES PATENTS

| | | |
|---|---|---|
| 1,590,449 | Simpson | June 29, 1926 |
| 1,742,253 | Jacobi | Jan. 7, 1930 |
| 2,352,049 | Weaver | June 20, 1944 |
| 2,379,861 | Browne | July 10, 1945 |
| 2,416,780 | Tellier | Mar. 4, 1947 |
| 2,426,800 | Triplett | Sept. 2, 1947 |
| 2,463,844 | Anderson | Mar. 8, 1949 |
| 2,537,971 | Dames | Jan. 16, 1951 |
| 2,575,715 | Keller | Nov. 20, 1951 |
| 2,581,734 | Triplett | Jan. 8, 1952 |

FOREIGN PATENTS

| | | |
|---|---|---|
| 905,499 | France | Dec. 5, 1945 |